US012008964B2

(12) United States Patent
Chun et al.

(10) Patent No.: US 12,008,964 B2
(45) Date of Patent: Jun. 11, 2024

(54) DISPLAY DEVICE AND METHOD OF DRIVING THE SAME

(71) Applicant: SAMSUNG DISPLAY CO., LTD., Yongin-si (KR)

(72) Inventors: Byung Ki Chun, Yongin-si (KR); Hyeon Min Kim, Yongin-si (KR); Young Wook Yoo, Yongin-si (KR); Jun Gyu Lee, Yongin-si (KR); Hyun Jun Lim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 392 days.

(21) Appl. No.: 17/338,961

(22) Filed: Jun. 4, 2021

(65) Prior Publication Data

US 2021/0398493 A1 Dec. 23, 2021

(30) Foreign Application Priority Data

Jun. 19, 2020 (KR) ........................ 10-2020-0075230

(51) Int. Cl.
*G09G 3/20* (2006.01)
*G09G 3/3275* (2016.01)

(52) U.S. Cl.
CPC ......... *G09G 3/3275* (2013.01); *G09G 3/2007* (2013.01); *G09G 3/2096* (2013.01); *G09G 2300/0452* (2013.01); *G09G 2310/027* (2013.01); *G09G 2320/0257* (2013.01); *G09G 2320/045* (2013.01); *G09G 2340/06* (2013.01)

(58) Field of Classification Search
None
See application file for complete search history.

(56) References Cited

U.S. PATENT DOCUMENTS

| | | | | |
|---|---|---|---|---|
| 10,027,411 | B2 | 7/2018 | Hong et al. | |
| 2010/0008426 | A1* | 1/2010 | Madden | G06T 9/00 375/240.18 |
| 2015/0030247 | A1* | 1/2015 | Shu | G06T 5/77 382/167 |
| 2017/0069244 | A1* | 3/2017 | Lim | G09G 3/2003 |
| 2018/0174529 | A1* | 6/2018 | de Greef | G09G 3/2092 |

FOREIGN PATENT DOCUMENTS

| | | | |
|---|---|---|---|
| KR | 101645136 | B1 | 8/2016 |

* cited by examiner

*Primary Examiner* — Parul H Gupta
(74) *Attorney, Agent, or Firm* — CANTOR COLBURN LLP

(57) ABSTRACT

A display device includes pixels, an image converter which generates a second image by correcting grayscales of a first logo in a first image for the pixels, and a data driver which provides data signals corresponding to the second image to the pixels. The image converter detects the first logo based on value and saturation of the first image, generates first map data corresponding to the first logo, and specifies pixels corresponding to the first logo based on the first map data.

19 Claims, 12 Drawing Sheets

DISPLAY DEVICE AND METHOD OF DRIVING THE SAME

The application claims priority to Korean Patent Application No. 10-2020-0075230, filed Jun. 19, 2020, and all the benefits accruing therefrom under 35 U.S.C. § 119, the content of which in its entirety is herein incorporated by reference.

BACKGROUND

1. Field

Embodiments of the invention relate to a display device and a method of driving the display device.

2. Description of the Related Art

With the development of information technology, the importance of display devices, which are a connection medium between users and information, has been emphasized. In response to this, the use of display devices such as a liquid crystal display device, an organic light emitting display device, a plasma display device, and the like has been increasing.

A display device may include a plurality of pixels and display an image (frame) through a combination of light emitted from the pixels. When a plurality of different images are continuously displayed, a user may recognize the images as a moving image. In addition, when a plurality of identical images are continuously displayed, the user may recognize the images as a still image.

SUMMARY

In a display device, when a still image is displayed for a long time, or when a part of a moving image such as a logo is displayed for a long time with a same luminance, pixel deterioration and afterimages may occur. In such a display device, grayscales of the logo can be corrected to prevent the afterimages.

Embodiments of the invention are directed to a display device in which a white logo and a color logo displayed in a logo area are accurately extracted and grayscales of the extracted logo are effectively corrected.

An embodiment of a display device according to the invention includes: pixels; an image converter which generates a second image by correcting grayscales of a first logo in a first image for the pixels; and a data driver which provides data signals corresponding to the second image to the pixels. In such an embodiment, the image converter detects the first logo based on value and saturation of the first image, generates first map data corresponding to the first logo, and specifies pixels corresponding to the first logo based on the first map data.

In an embodiment, the image converter may detect a second logo in the first image, generate second map data corresponding to the second logo, specify pixels corresponding to the second logo based on the second map data, and generate the second image by further correcting grayscales of the second logo.

In an embodiment, the image converter may include: a first logo detector which generates first sub-map data based on the value of the first image, generating second sub-map data based on the saturation of the first image, and generates the first map data by combining the first sub-map data and the second sub-map data; a second logo detector which generates the second map data based on a white mark of the first image; a logo determiner which generates third map data using the first map data and the second map data; and a grayscale converter which specifies the pixels corresponding to the first logo and the pixels corresponding to the second logo based on the third map data, and generates the second image by converting grayscales of the pixels corresponding to the first logo and the pixels corresponding to the second logo in the first image.

In an embodiment, the first logo detector may include a coordinate converter which converts the first image of RGB color space coordinates to a third image of HSV color space coordinates.

In an embodiment, the first logo detector may further include: a first map data extractor which generates the first sub-map data corresponding to an area having a value equal to or greater than a threshold value among the third image; and a second map data extractor which generates the second sub-map data corresponding to an area having a saturation equal to or greater than a threshold saturation among the third image.

In an embodiment, the first map data may be generated based on an intersection of the first sub-map data and the second sub-map data.

In an embodiment, the second logo detector may generate the second map data corresponding to an area having a white mark equal to or greater than a threshold white mark in the first image.

In an embodiment, the white mark may be a grayscale value of the first image.

In an embodiment, the second logo detector may generate the second map data based on the value of the first image.

In an embodiment, the third map data may be generated based on a combination of the first map data and the second map data.

In an embodiment, the first logo may include a color mark, and the second logo may include a white mark.

In an embodiment, the first logo detector and the second logo detector may generate the first map data and the second map data based on an Otsu binarization method.

An embodiment of a method of driving a display device according to the invention includes: detecting a first logo in a first image based on value and saturation of the first image; generating first map data corresponding to the first logo; detecting a second logo in the first image based on a white mark of the first image; generating second map data corresponding to the second logo; generating third map data using the first map data and the second map data; specifying pixels corresponding to the first logo and pixels corresponding to the second logo based on the third map data; and generating a second image by correcting grayscales of the pixels corresponding to the first logo and the pixels corresponding to the second logo in the first image.

In an embodiment, the generating the first map data may include: converting the first image of RGB color space coordinates to a third image of HSV color space coordinates; generating first sub-map data corresponding to an area having a value equal to or greater than a threshold value among the third image; generating second sub-map data corresponding to an area having a saturation equal to or greater than a threshold saturation among the third image; and generating the first map data by combining the first sub-map data and the second sub-map data.

In an embodiment, the first map data may be generated based on an intersection of the first sub-map data and the second sub-map data.

In an embodiment, the second map data may be generated corresponding to an area having a white mark equal to or greater than a threshold white mark in the first image.

In an embodiment, the white mark may be a grayscale value of the first image.

In an embodiment, the second map data may be generated based on the white mark and the value of the first image.

In an embodiment, the third map data may be generated based on a combination of the first map data and the second map data.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
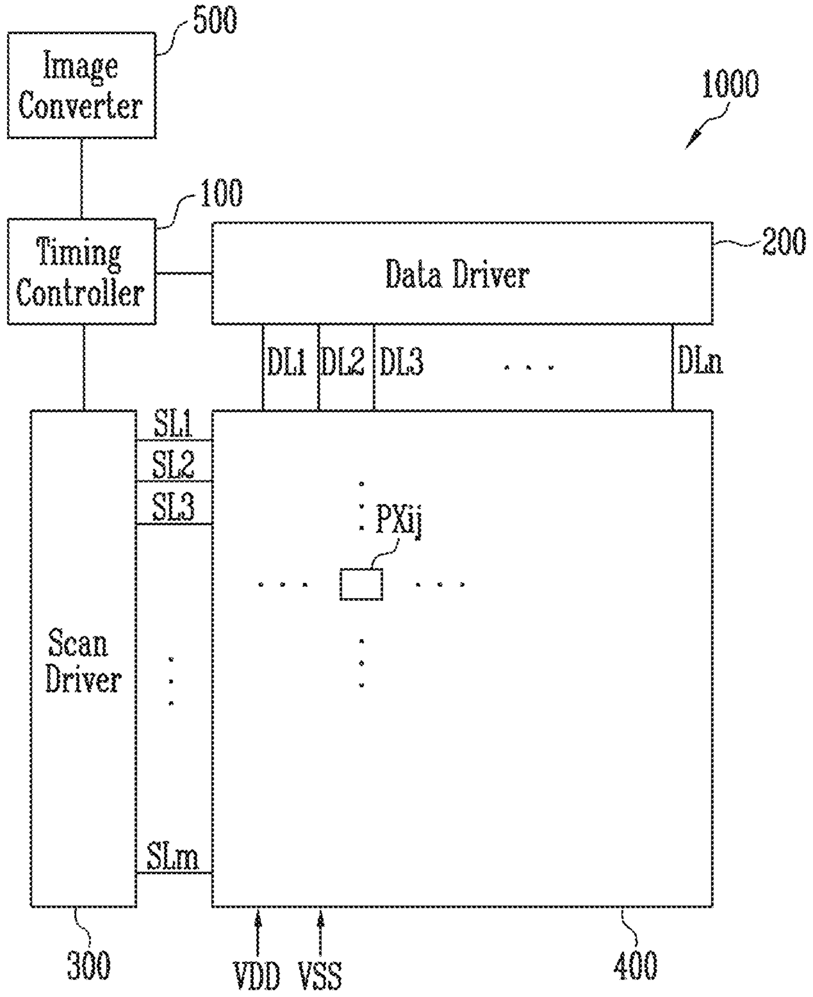
FIG. 1 is a block diagram illustrating a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In addition, when an element is "coupled to" or "connected to" another element, this includes not only the case where the element is directly coupled to the other element, but also the case where another element is coupled therebetween. In contrast, when an element is referred to as being "coupled directly to" or "connected directly to" another element, there are no intervening elements present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

FIG. 1 is a block diagram illustrating a display device according to an embodiment of the invention.

Referring to FIG. 1, an embodiment of a display device 1000 according to the invention may include a timing controller 100, a data driver 200, a scan driver 300, a pixel unit 400 (or a display panel), and an image converter 500.

The timing controller 100 may receive grayscales and control signals for each first image (frame) from an external processor. In one embodiment, for example, in the case of displaying a still image, the grayscales of consecutive first images may be substantially the same as each other. In one embodiment, for example, in the case of displaying a moving image, the grayscales of consecutive first images may be substantially different from each other. In such an embodiment, a part of the moving image may be a still area such as a logo.

The image converter 500 may generate a second image by correcting the grayscales of the logo in the first image.

In an embodiment, the image converter 500 may generate (or extract) map data corresponding to a logo area larger than the logo in the first image, and correct the grayscales of the logo using the generated map data.

In one embodiment, for example, the image converter 500 may generate first map data corresponding to a first logo including a color mark in the first image. In such an embodiment, the image converter 500 may generate second map data corresponding to a second logo including a white mark in the first image. In such an embodiment, the image converter 500 may generate third map data using the first map data and the second map data. The image converter 500 may specify (determine or select) pixels corresponding to the logo (for example, the first logo and/or the second logo) based on the third map data. In such an embodiment, the image converter 500 may generate the second image by correcting the grayscales of the pixels specified as corresponding to the logo.

The timing controller 100 may provide the grayscales of the second image to the data driver 200. In an embodiment, the timing controller 100 may provide control signals suitable for each specification to the data driver 200, the scan driver 300, or the like to display the second image.

In an embodiment, as shown in FIG. 1, the timing controller 100 and the image converter 500 may be separate components. However, this is merely exemplary, and the timing controller 100 and the image converter 500 may be integrally configured as a single unit. In one embodiment, for example, the image converter 500 may be implemented in a form embedded in the timing controller 100.

The data driver 200 may provide data signals corresponding to the second image to pixels. In one embodiment, for example, the data driver 200 may generate the data signals to be provided to data lines DL1, DL2, DL3, . . . , and DLn using the grayscales of the second image and the control signals. In one embodiment, for example, the data driver 200 may sample the grayscales using a clock signal and apply the data signals corresponding to the grayscales to the data lines DL1 to DLn in units of pixel rows. A pixel row may mean pixels connected to a same scan line, where n may be an integer greater than 0.

The scan driver 300 may receive a clock signal, a scan start signal, or the like from the timing controller 100 and generate scan signals to be provided to scan lines SL1, SL2, SL3, . . . , and SLm, where m may be an integer greater than 0.

The scan driver 300 may sequentially supply the scan signals having a turn-on level pulse to the scan lines SL1 to SLm. In one embodiment, for example, the scan driver 300 may include scan stages configured in the form of a shift register. The scan driver 300 may generate the scan signals by sequentially transmitting the scan start signal in the form of a turn-on level pulse to a next scan stage based on the clock signal.

The pixel unit 400 may include the pixels. Each pixel PXij may be connected to a corresponding data line and a corresponding scan line, where i and j may be integers greater than 0. The pixel PXij may mean a pixel whose scan transistor is connected to an i-th scan line and a j-th data line. In an embodiment, each pixel PXij may receive voltages of a first power source VDD and a second power source VSS from outside. Here, the first power source VDD and the second power source VSS may be voltages used for the operation of the pixels. In one embodiment, for example, the first power source VDD may have a voltage level higher than a voltage level of the second power source VSS.

Figure 2:
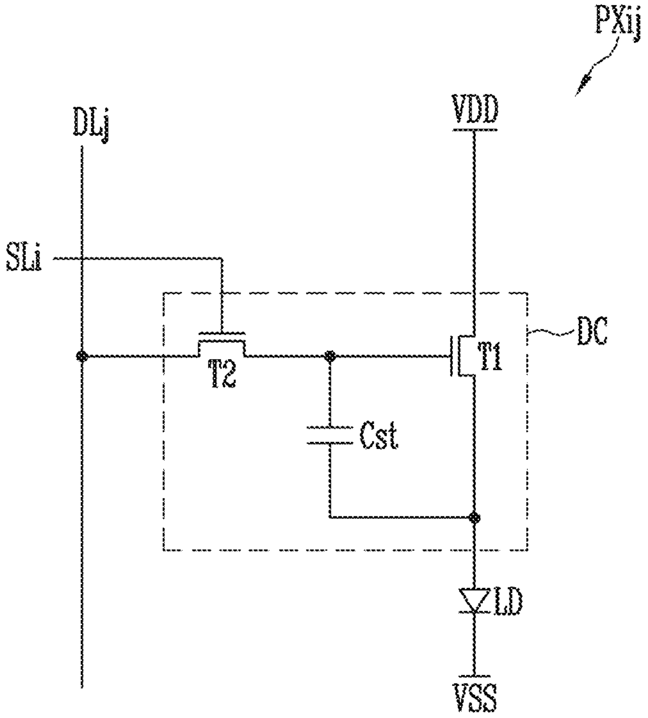
FIG. 2 is a circuit diagram illustrating an embodiment of a pixel included in the display device of FIG. 1.

FIG. 2 is a circuit diagram illustrating an embodiment of a pixel included in the di splay device of FIG. 1.

Referring to FIG. 2, an embodiment of the pixel PXij may include a light emitting element LD and a driving circuit DC connected thereto to drive the light emitting element LD.

A first electrode (for example, an anode electrode) of the light emitting element LD may be connected to the first power source VDD via the driving circuit DC, and a second electrode (for example, a cathode electrode) of the light emitting element LD may be connected to the second power source VSS. The light emitting element LD may emit light at a luminance corresponding to the amount of driving current controlled by the driving circuit DC.

The light emitting element LD may include or be composed of an organic light emitting diode. Alternatively, the light emitting element LD may include or be composed of an inorganic light emitting diode such as a micro light emitting diode ("LED") or a quantum dot light emitting diode. Alternatively, the light emitting element LD may be an element including or composed of an organic material and an inorganic material. In an embodiment, as shown in FIG. 2, the pixel PXij includes a single light emitting element LD. However, in an alternative embodiment, the pixel PXij may include a plurality of light emitting elements, and the plurality of light emitting elements may be connected to each other in series, in parallel or in series and parallel.

The first power source VDD and the second power source VSS may have different potentials from each other. In one embodiment, for example, a voltage applied through the first power source VDD may be greater than a voltage applied through the second power source VSS.

The driving circuit DC may include a first transistor T1, a second transistor T2, and a storage capacitor Cst.

A first electrode of the first transistor T1 (a driving transistor) may be connected to the first power source VDD, and a second electrode of the first transistor T1 may be electrically connected to the first electrode (for example, the anode electrode) of the light emitting element LD. A gate electrode of the first transistor T1 may be connected to a first node N1. The first transistor T1 may control the amount of driving current supplied to the light emitting element LD in response to a data signal supplied to the first node N1 through a data line DLj.

A first electrode of the second transistor T2 (a switching transistor) may be connected to the data line DLj, and a second electrode of the second transistor T2 may be connected to the first node N1. A gate electrode of the second transistor T2 may be connected to a scan line SLi.

The second transistor T2 may be turned on when a scan signal of a voltage (for example, a gate-on voltage) in a turn-on level, at which the second transistor T2 is turned on, is supplied from the scan line SLi, and thus the data line DLj and the first node N1 may be electrically connected. When the second transistor is turned on, the data signal of a corresponding frame may be supplied to the data line DLj, and accordingly, the data signal may be transmitted to the first node N1. A voltage corresponding to the data signal transmitted to the first node N1 may be stored in the storage capacitor Cst.

One electrode of the storage capacitor Cst may be connected to the first node N1, and another electrode of the storage capacitor Cst may be connected to the first electrode of the light emitting element LD. The storage capacitor Cst may be charged with the voltage corresponding to the data signal supplied to the first node N1, and may maintain the charged voltage until the data signal of the next frame is supplied.

FIG. 2 shows an embodiment of the pixel PXij having a relatively simple structure for convenience of illustration and description. However, the structure of the driving circuit DC may be variously changed or modified. In one alternative embodiment, for example, the driving circuit DC may include various transistors such as a compensation transistor for compensating a threshold voltage of the first transistor T1, an initialization transistor for initializing the first node N1, and/or a light emitting control transistor for controlling a light emitting time of the light emitting element LD. In an alternative embodiment, the driving circuit DC may further include other circuit elements such as a boosting capacitor for boosting the voltage of the first node N1.

In an embodiment, as shown in FIG. 2, the transistors included in the driving circuit DC, for example, the first and second transistors T1 and T2 may be N-type transistors, but the invention is not limited thereto. Alternatively, at least one of the first and second transistors T1 and T2 included in the driving circuit DC may be a P-type transistor.

Figure 3:
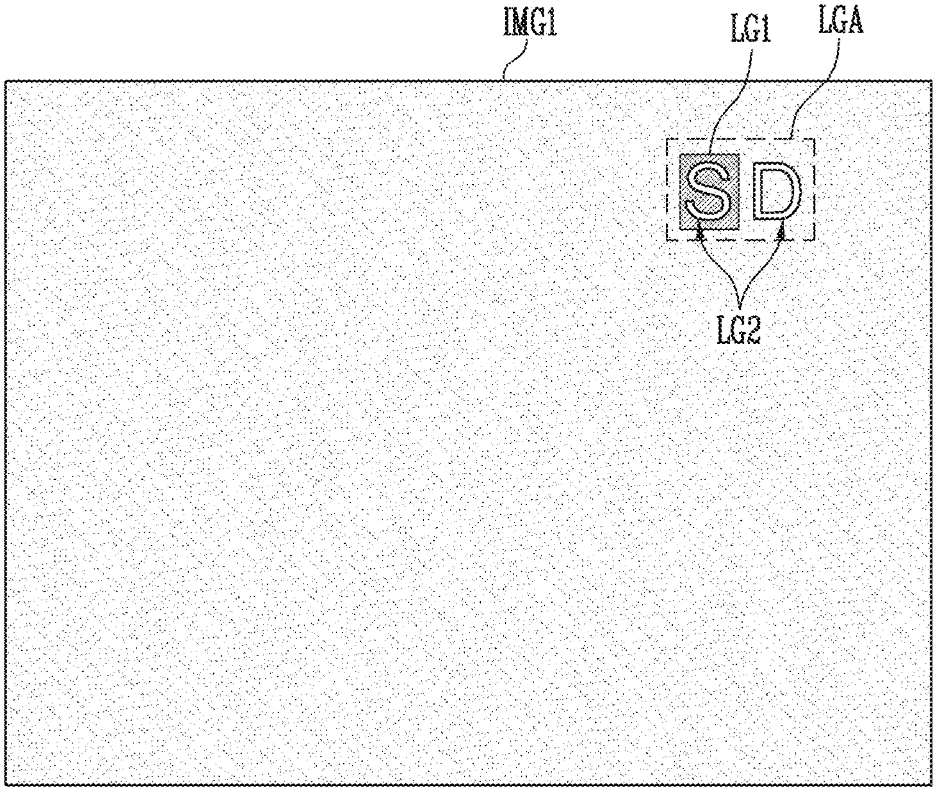
FIG. 3 is a diagram showing embodiments of a first image, a logo area, a first logo, and a second logo.

FIG. 3 is a diagram showing embodiments of a first image, a logo area, a first logo, and a second logo.

Referring to FIGS. 1 and 3, FIG. 3 shows an embodiment where the pixel unit 400 displays a first image IMG1, for example. The first image IMG1 may be data including the grayscales for each of the pixels of the pixel unit 400. Here, one first image IMG1 may correspond to one frame. Herein, a period in which one first image IMG1 is displayed may be referred to as one frame period. In such an embodiment, a start time point and an end time point of the frame period may be different for each pixel row. In one embodiment, for example, a time point when scan transistors of a pixel row are turned on to receive the data signals corresponding to the current first image IMG1 may be the start time point of the frame period of the pixel row, and a time point when the scan transistors are turned on again to receive the data signals corresponding to the next first image IMG1 may be the end time point of the frame period of a corresponding pixel row.

The logo area (or an area including the first logo LG1 and/or the second logo LG2) may be a still image area in which the position and grayscale are maintained in consecutive first images IMG1. In one embodiment, for example, the first logo LG1 may be a logo including the color mark, and the second logo LG2 may be a logo including the white mark. In such an embodiment, the first logo LG1 may be displayed in a form surrounding a part of the second logo LG2 (e.g., the letter “S” shown in FIG. 3).

A logo area LGA may include the first and second logos LG1 and LG2 and may be an area larger than the first and second logos LG1 and LG2. In one embodiment, for example, the logo area LGA may be a rectangular area, such that the logo area LGA may be easily defined with coordinate values based on the x and y axes. In an alternative embodiment, the logo area LGA may be defined as other shapes such as a circle or an oval. An area other than the first and second logos LG1 and LG2 among the logo area LGA may be defined as a background.

Figure 4:
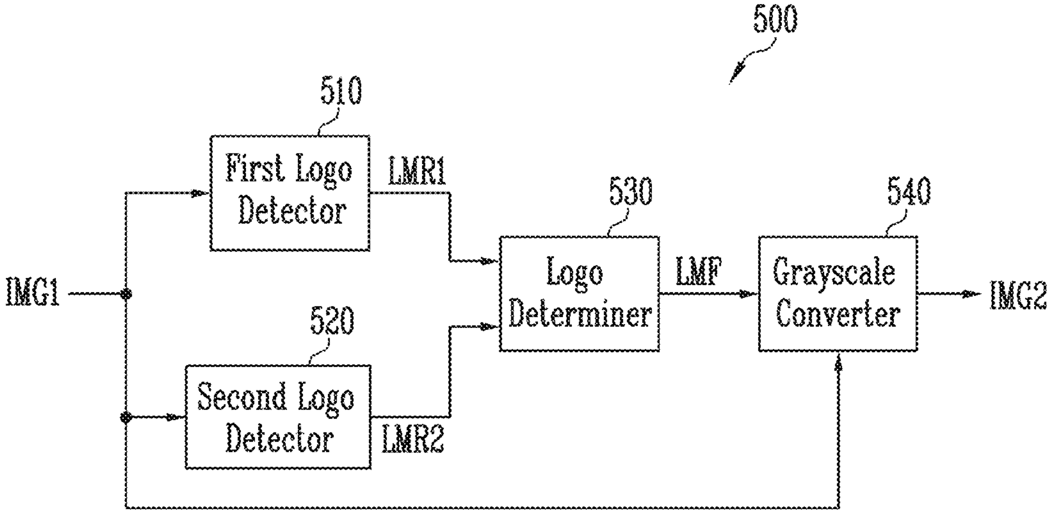
FIG. 4 is a block diagram illustrating an embodiment of an image converter included in the display device of FIG. 1.
Figure 5:
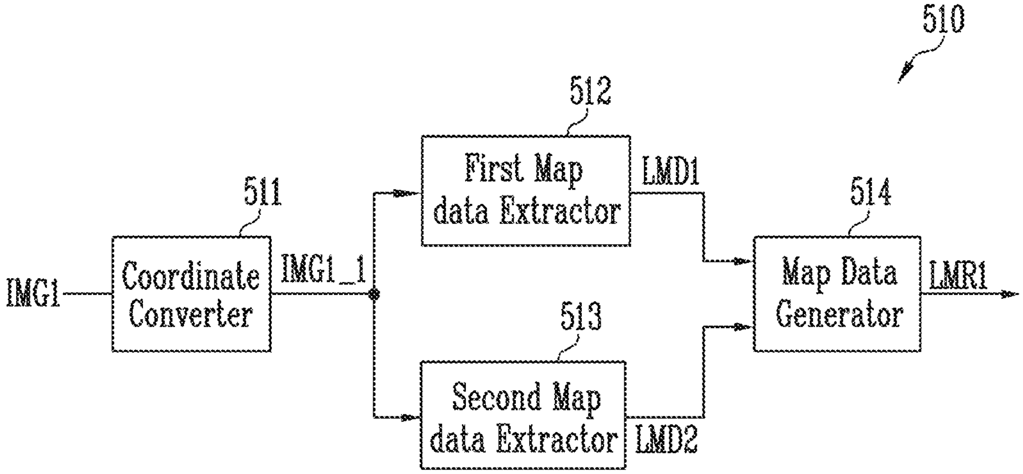
FIG. 5 is a block diagram illustrating an embodiment of a first logo detector included in the image converter of FIG. 4.
Figure 6A:
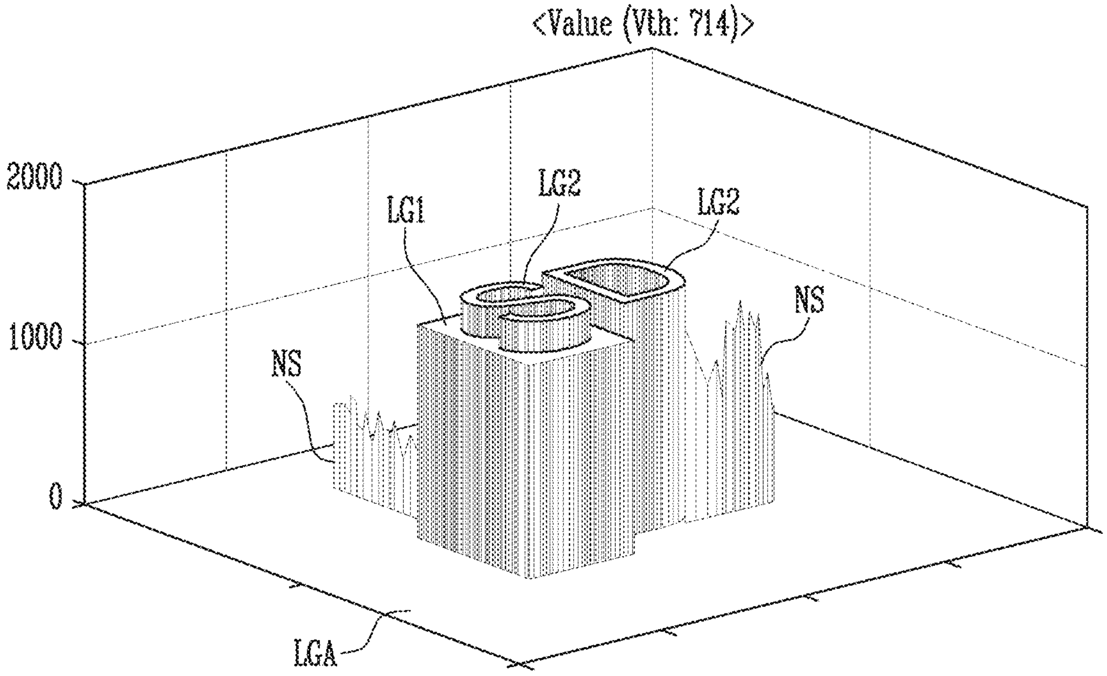
FIGS. 6A and 6B are diagrams showing an embodiment of first sub-map data generated by a first map data extractor included in the first logo detector of FIG. 5.
Figure 6B:
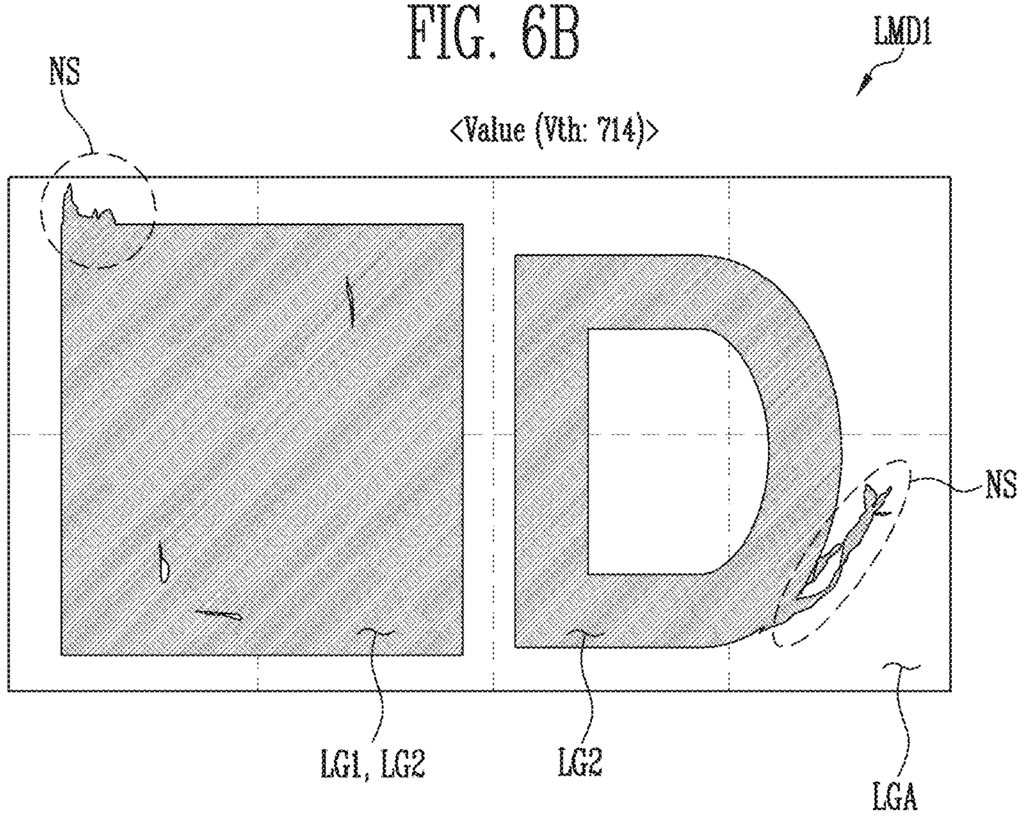
Figure 7A:
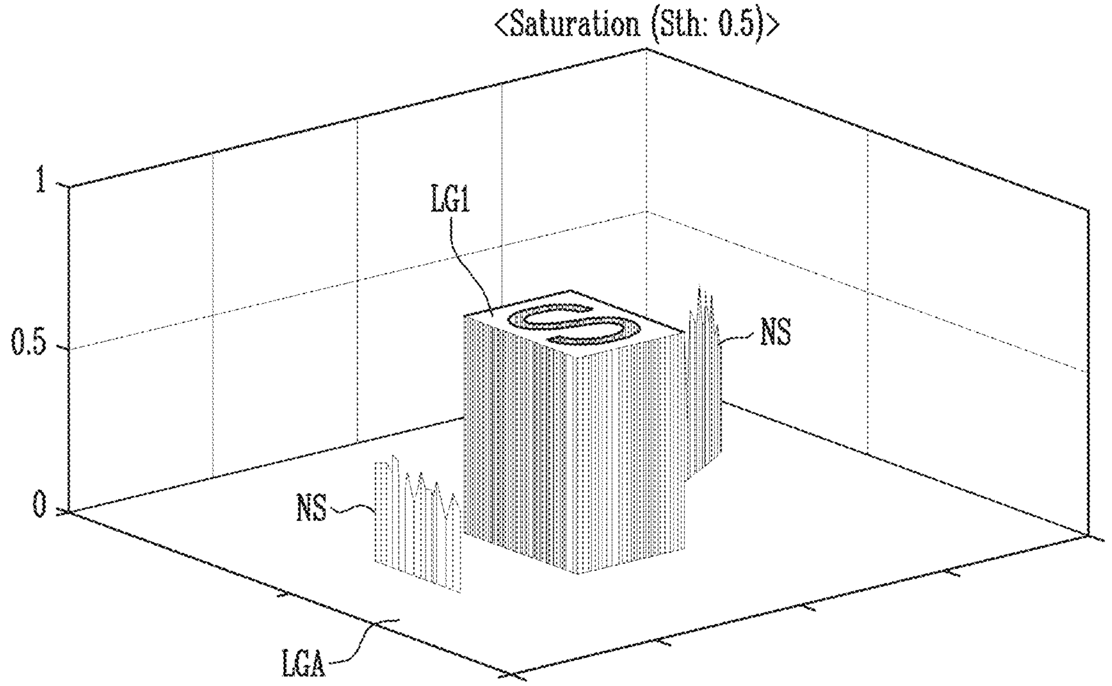
FIGS. 7A and 7B are diagrams showing an embodiment of second sub-map data generated by a second map data extractor included in the first logo detector of FIG. 5.
Figure 7B:
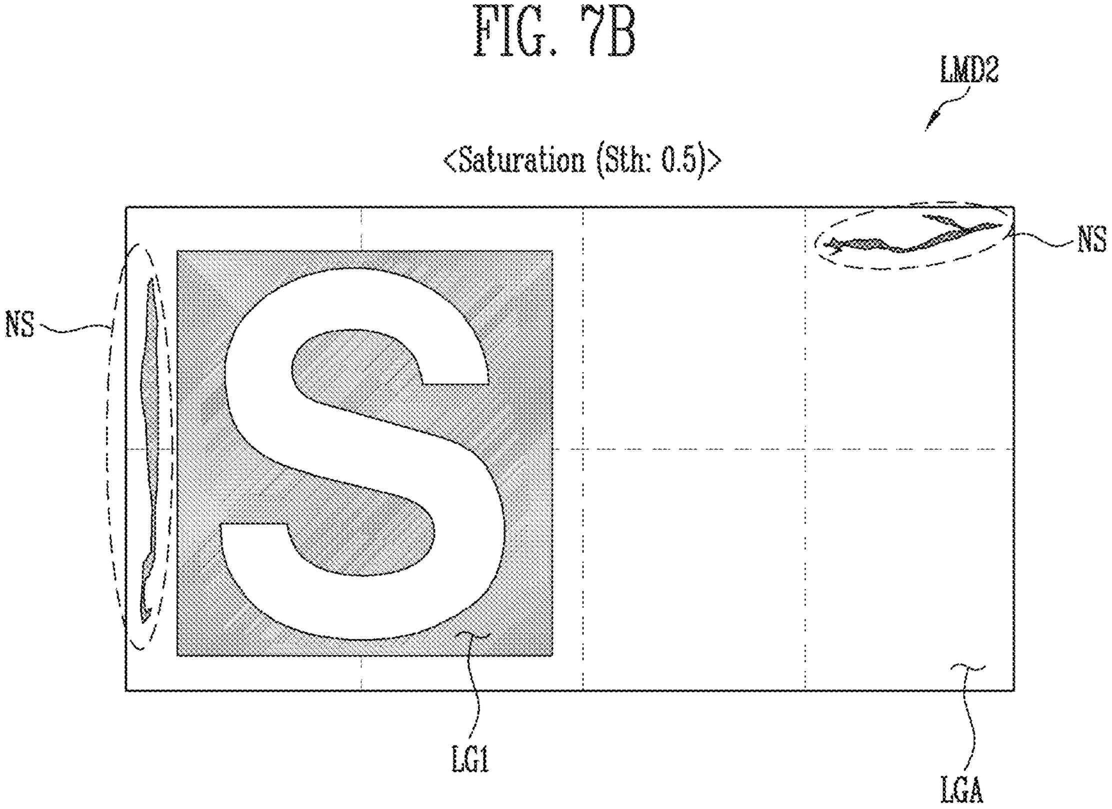
Figure 8:
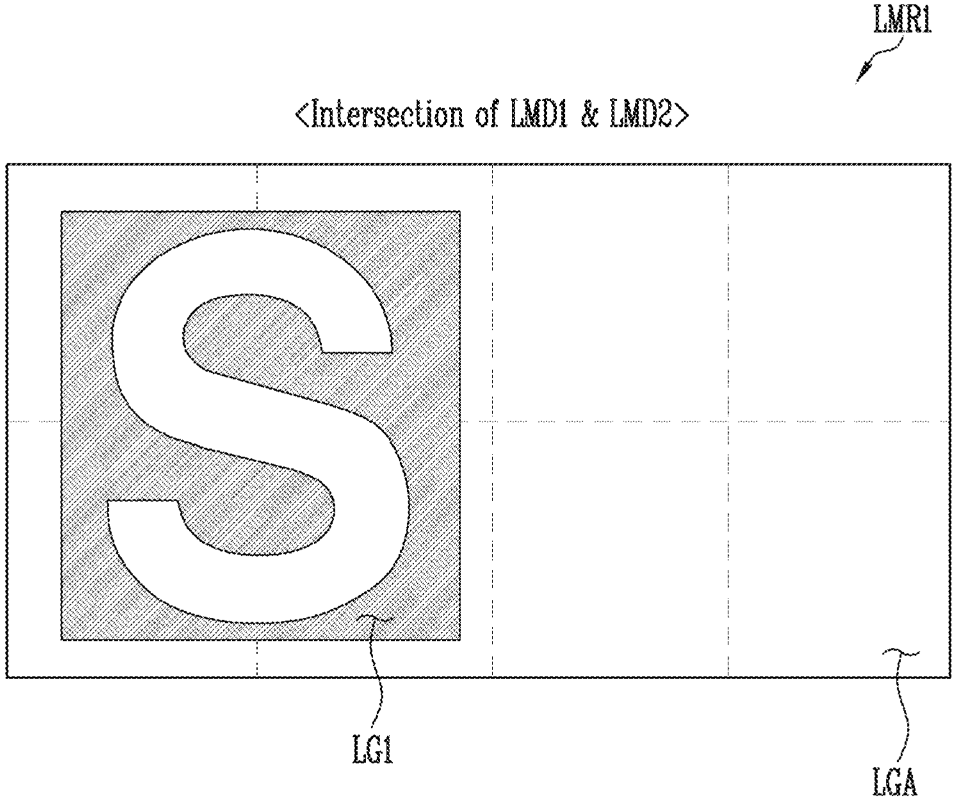
FIG. 8 is a diagram showing an embodiment of first map data generated by a map data generator included in the first logo detector of FIG. 5.
Figure 9A:
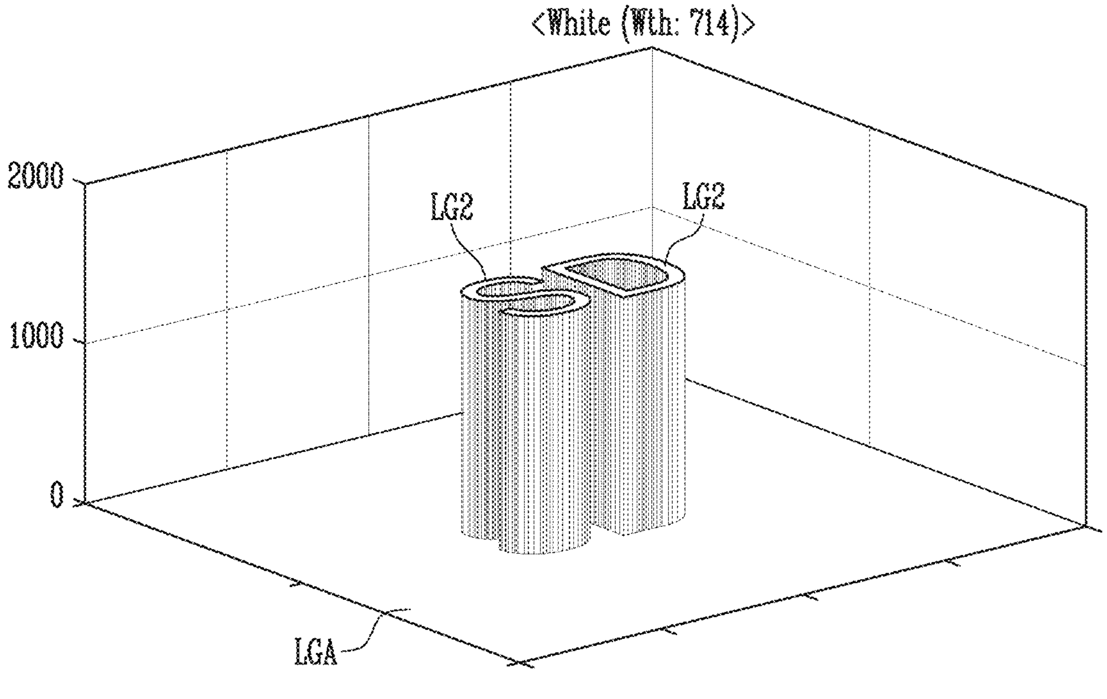
FIGS. 9A and 9B are diagrams showing an embodiment of second map data generated by a second logo detector included in the image converter of FIG. 4.
Figure 9B:
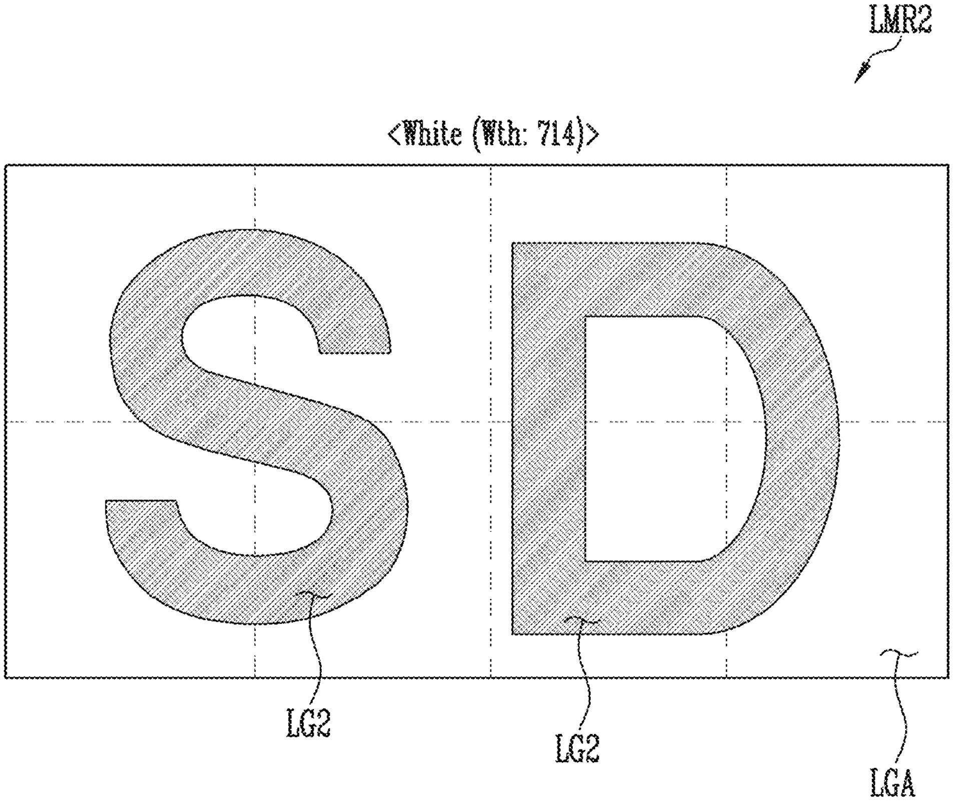
Figure 10:
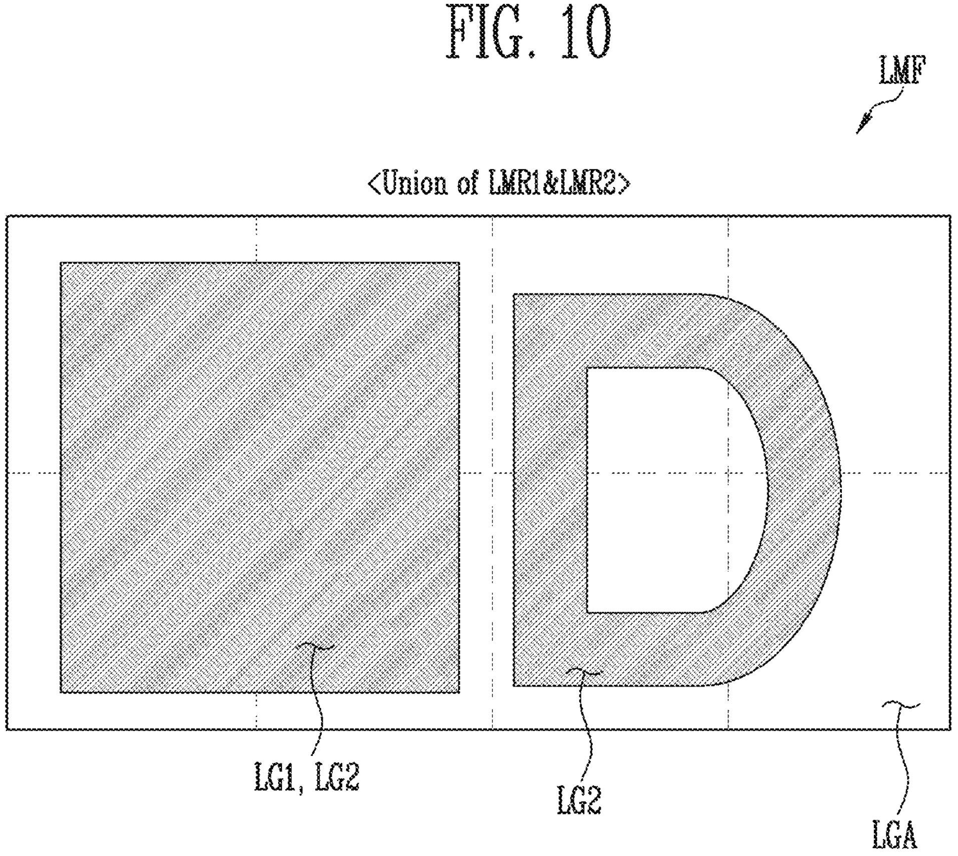
FIG. 10 is a diagram showing an embodiment of third map data generated by a logo determiner included in the image converter of FIG. 4.

FIG. 4 is a block diagram illustrating an embodiment of an image converter included in the display device of FIG. 1. FIG. 5 is a block diagram illustrating an embodiment of a first logo detector included in the image converter of FIG. 4. FIGS. 6A and 6B are diagrams showing an embodiment of first sub-map data generated by a first map data extractor included in the first logo detector of FIG. 5. FIGS. 7A and 7B are diagrams showing an embodiment of second sub-map data generated by a second map data extractor included in the first logo detector of FIG. 5. FIG. 8 is a diagram showing an embodiment of first map data generated by a map data generator included in the first logo detector of FIG. 5. FIGS. 9A and 9B are diagrams showing an embodiment of second map data generated by a second logo detector included in the image converter of FIG. 4. FIG. 10 is a diagram showing an embodiment of third map data generated by a logo determiner included in the image converter of FIG. 4.

Referring to FIGS. 3 and 4, an embodiment of the image converter 500 according to the invention may include a first logo detector 510, a second logo detector 520, a logo determiner 530, and a grayscale converter 540.

In an embodiment, the image converter 500 may generate (or extract) map data (first to third map data LMR1, LMR2, and LMF) corresponding to the logo area LGA in the first image IMG1, and correct the grayscales of the first logo LG1 and/or the second logo LG2 using the generated map data LMR1, LMR2, and LMF.

In one embodiment, for example, the image converter 500 may generate the first map data LMR1 corresponding to the first logo LG1 including the color mark in the first image IMG1. In such an embodiment, the image converter 500 may generate the second map data LMR2 corresponding to the second logo LG2 including the white mark in the first image IMG1. In such an embodiment, the image converter 500 may generate the third map data LMF using the first map data LMR1 and the second map data LMR2. The image converter 500 may specify the pixels corresponding to the first logo LG1 and/or the second logo LG2 based on the third map data LMF. In an embodiment, the image converter 500 may generate second image IMG2 by correcting the grayscales of the pixels specified as corresponding to the first logo LG1 and/or the second logo LG2.

The first logo detector 510 may detect the first logo LG1 in the first image IMG1 and generate the first map data LMR1 corresponding to the first logo LG1.

In an embodiment, the first logo detector 510 may convert the first image IMG1 from RGB color space coordinates to HSV color space coordinates to detect the first logo LG1 including the color mark, and detect the first logo LG1 based on value (or brightness) and saturation in the logo area LGA among the converted first image IMG1 (hereinafter, referred to as a third image).

Referring to FIG. 5, an embodiment of the first logo detector 510 may include a coordinate converter 511, a first map data extractor 512, a second map data extractor 513, and a map data generator 514.

The coordinate converter 511 may convert the first image IMG1 of the RGB color space coordinates to a third image IMG1_1 of the HSV color space coordinates. In an embodiment, each pixel (for example, the pixel Pxij shown in FIG. 2) of the display device (for example, the display device 1000 shown in FIG. 1) may include a sub-pixel that emits red light, a sub-pixel that emits green light, and a sub-pixel that emits blue light. In such an embodiment, the first image IMG1 may be expressed in the RGB color space coordinates of red, green, and blue. In such an embodiment, the coordinate converter 511 may generate the third image IMG1_1 of the HSV color space coordinates having hue, saturation, and value (or brightness) by converting the first image IMG1 of the RGB color space coordinates to detect the first logo LG1 of the color mark.

The first map data extractor 512 may generate (or extract) first sub-map data LMD1 based on the third image IMG1_1 of the HSV color space coordinates.

In an embodiment, the first map data extractor 512 may generate the first sub-map data LMD1 based on an area having the value equal to or greater than a predetermined threshold value in the logo area LGA.

In one embodiment, for example, as shown in FIGS. 6A and 6B, the first map data extractor 512 may generate the first sub-map data LMD1 shown in FIG. 6B by extracting pixels having the value of 714 or more, which is a threshold value Vth (or a threshold brightness), among the logo area LGA. Here, the threshold value Vth may be a predetermined value by an experiment or the like. The value of 714 is merely an example, and the threshold value Vth is not limited thereto.

In an embodiment, the first logo LG1 including the color mark as well as the second logo LG2 including the white mark may have a high value. In such an embodiment, when a relatively bright image is displayed in the area (or background) excluding the first and second logos LG1 and LG2 among the logo area LGA according to the image displayed by the first image IMG1, the value in the corresponding area may be high. In this case, on the first sub-map data LMD1, the pixels corresponding to the first logo LG1 as well as the pixels corresponding to the second logo LG2 and/or the area in which the bright image is displayed (or a noise area NS) may be extracted as pixels having the threshold value Vth or higher.

The second map data extractor 513 may generate (or extract) second sub-map data LMD2 based on the third image IMG1_1 of the HSV color space coordinates.

In an embodiment, the second map data extractor 513 may generate the second sub-map data LMD2 based on an area having the saturation equal to or greater than a predetermined threshold saturation in the logo area LGA.

In one embodiment, for example, as shown in FIGS. 7A and 7B, the second map data extractor 513 may generate the second sub-map data LMD2 shown in FIG. 7B by extracting pixels having the value of 0.5 or more, which is a threshold saturation Sth, among the logo area LGA. Here, the threshold saturation Sth may be a predetermined value by an experiment or the like. The value of 0.5 is merely an example, and the threshold saturation Sth is not limited thereto.

In an embodiment, in the image displayed by the first image IMG1 as well as the first logo LG1 including the color mark, a high saturation image may be displayed in the area excluding the first and second logos LG1 and LG2 (or the background) among the logo area LGA. In this case, on the second sub-map data LMD2, the pixels corresponding to the first logo LG1 as well as the pixels corresponding to the area in which the high saturation image is displayed (or a noise area NS) may be extracted as pixels having the threshold saturation Sth or higher.

The map data generator 514 may generate the first map data LMR1 corresponding to the first logo LG1 by detecting the first logo LG1 including the color mark.

In an embodiment, the map data generator 514 may generate the first map data LMR1 using the first sub-map data LMD1 and the second sub-map data LMD2. In one embodiment, for example, since the first logo LG1 displayed in the logo area LG includes the color mark, the value and saturation of the first logo LG1 may be relatively high. The map data generator 514 may generate the first map data LMR1 of FIG. 8 by combining the first sub-map data LMD1 and the second sub-map data LMD2. In one embodiment, for example, as shown in FIG. 8, the first map data LMR1 may be generated based on or in the form of an intersection of the first sub-map data LMD1 and the second sub-map data LMD2. Accordingly, on the first map data LMR1, the pixels corresponding to the first logo LG1 that is greater than or equal to the threshold value Vth and greater than or equal to the threshold saturation Sth may be extracted. In such an embodiment, since the first sub-map data LMD1 and the second sub-map data LMD2 are combined in the form of the intersection to generate the first map data LMR1, only pixels corresponding to the first logo LG1 except for the noise area (for example, the noise area NS shown in FIG. 6A and/or FIG. 7A) may be accurately extracted on the first map data LMR1.

Referring back to FIG. 4, the second logo detector 520 may generate the second map data LMR2 corresponding to the second logo LG2 by detecting the second logo LG2 in the first image IMG1.

In an embodiment, the second logo detector 520 may generate the second map data LMR2 based on an area having the white mark equal to or greater than a predetermined threshold white mark to detect the second logo LG2 including the white mark.

In one embodiment, for example, as shown in FIGS. 9A and 9B, the second logo detector 520 may generate the second map data LMR2 shown in FIG. 9B by extracting the pixels having the white mark of 714 or more, which is a threshold white mark Wth among the logo area LGA. Here, the threshold white mark Wth may be a predetermined value by an experiment or the like. The value of 714 is merely an example, and the threshold white mark Wth is not limited thereto.

In an embodiment, the white mark may be a grayscale value of the first image IMG1.

In an embodiment, the second logo detector 520 may generate the second map data LMR2 using the value as well as the white mark. In one embodiment, for example, the second logo detector 520 may generate the second map data LMR2 by extracting pixels having the white mark of 714 or more, which is the threshold white mark Wth, and the value of 714 or more, which is the threshold value Vth among the logo area LGA. Since the second logo LG2 including the white mark is displayed as a relatively bright image, when the second logo detector 520 generates the second map data LMR2 using the value as well as the white mark, accuracy may be further improved in extracting the second logo LG2.

In an embodiment, the first and second logo detectors 510 and 520 may use a conventional logo detection algorithm to extract the first and second logos LG1 and LG2. In one embodiment, for example, a logo detection algorithm using Otsu binarization method may be performed. Otsu binarization method is an adaptive thresholding way for binarization in image processing, which is well known in the art.

The logo determiner 530 may generate the third map data LMF using the first map data LMR1 and the second map data LMR2. In one embodiment, for example, the logo determiner 530 may generate the third map data LMF by extracting pixels extracted corresponding to the first logo LG1 on the first map data LMR1 and pixels extracted corresponding to the second logo LG2 on the second map data LMR2 as the pixels corresponding to the logo. In one embodiment, for example, the third map data LMF may be generated in the form of a union (or based on a combination) of the first map data LMR1 and the second map data LMR2 as shown in FIG. 10. In such an embodiment, since the first map data LMR1 and the second map data LMR2 are combined in the form of the union to generate the third map data LMF, all pixels corresponding to the first logo LG1 and the second logo LG2 may be extracted on the third map data LMF. 2

The grayscale converter 540 may specify the pixels corresponding to the first and second logos LG1 and LG2 based on the third map data LMF, and generate the second image IMG2 by converting the grayscales of the specified pixels in the first image IMG1.

The grayscale converter 540 may generate the second image IMG2 by reducing the grayscales of the pixels corresponding to the first and second logos LG1 and LG2 in the first image IMG1. Accordingly, luminance of light emitted from the pixels corresponding to the first and second logos LG1 and LG2 among consecutive frame periods may be reduced to prevent afterimages.

In embodiments of the invention, as described above with reference to FIGS. 4 and 5, the image converter 500 may accurately extract the first logo LG1 and the second logo LG2 of the logo area LGA, and correct the grayscales of the pixels corresponding to the first logo LG1 including the color mark as well as the second logo LG2 including the white mark among the logo area LGA. Accordingly, pixel deterioration and afterimages in the logo area LGA may be removed (or reduced).

Embodiments of the display device according to the invention may accurately extract a color logo as well as a white logo displayed in the logo area and correct the grayscales of the extracted logo. Accordingly, the pixel deterioration and afterimages in the logo area LGA may be removed (or reduced).

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

pixels;

an image converter which generates a second image by correcting grayscales of a first logo in a first image for the pixels; and a data driver which provides data signals corresponding to the second image to the pixels, wherein the image converter detects the first logo based on value and saturation of the first image, generates first map data corresponding to the first logo, and specifies pixels corresponding to the first logo based on the first map data, wherein the image converter includes a first logo detector which generates first sub-map data based on the value of the first image, generates second sub-map data based on the saturation of the first image, and generates the first map data by combining the first sub-map data and the second sub-map data.

2. The display device of claim 1, wherein the image converter detects a second logo in the first image, generates second map data corresponding to the second logo, specifies pixels corresponding to the second logo based on the second map data, and generates the second image by further correcting grayscales of the second logo.

3. The display device of claim 2, wherein the image converter includes:

a second logo detector which generates the second map data based on a white mark of the first image;

a logo determiner which generates third map data using the first map data and the second map data; and a grayscale converter which specifies the pixels corresponding to the first logo and the pixels corresponding to the second logo based on the third map data, and generates the second image by converting grayscales of the pixels corresponding to the first logo and the pixels corresponding to the second logo in the first image.

4. The display device of claim 3, wherein the first logo detector includes a coordinate converter which converts the first image of RGB color space coordinates to a third image of HSV color space coordinates.

5. The display device of claim 4, wherein the first logo detector further includes:

a first map data extractor which generates the first sub-map data corresponding to an area having a value equal to or greater than a threshold value among the third image; and a second map data extractor which generates the second sub-map data corresponding to an area having a saturation equal to or greater than a threshold saturation among the third image.

6. The display device of claim 3, wherein the first map data is generated based on an intersection of the first sub-map data and the second sub-map data.

7. The display device of claim 3, wherein the second logo detector generates the second map data corresponding to an area having a white mark equal to or greater than a threshold white mark in the first image.

8. The display device of claim 7, wherein the white mark is a grayscale value of the first image.

9. The display device of claim 3, wherein the second logo detector generates the second map data based on the value of the first image.

10. The display device of claim 3, wherein the third map data is generated based on a combination of the first map data and the second map data.

11. The display device of claim 3, wherein the first logo detector and the second logo detector generate the first map data and the second map data based on an Otsu binarization method.

12. The display device of claim 2, wherein the first logo includes a color mark, and the second logo includes a white mark.

13. A method of driving a display device, the method comprising:

detecting a first logo in a first image based on value and saturation of the first image;

generating first map data corresponding to the first logo;

detecting a second logo in the first image based on a white mark of the first image;

generating second map data corresponding to the second logo;

generating third map data using the first map data and the second map data;

specifying pixels corresponding to the first logo and pixels corresponding to the second logo based on the third map data; and generating a second image by correcting grayscales of the pixels corresponding to the first logo and the pixels corresponding to the second logo in the first image, wherein the generating the first map data includes:

converting the first image to a third image;

generating first sub-map data corresponding to an area having a value equal to or greater than a threshold value among the third image;

generating second sub-map data corresponding to an area having a saturation equal to or greater than a threshold saturation among the third image; and generating the first map data by combining the first sub-map data and the second sub-map data.

14. The method of claim 13, wherein the generating the first map data includes:

converting the first image of RGB color space coordinates to the third image of HSV color space coordinates.

15. The method of claim 14, wherein the first map data is generated based on an intersection of the first sub-map data and the second sub-map data.

16. The method of claim 13, wherein the second map data is generated corresponding to an area having a white mark equal to or greater than a threshold white mark in the first image.

17. The method of claim 16, wherein the white mark is a grayscale value of the first image.

18. The method of claim 13, wherein the second map data is generated based on the white mark and the value of the first image.

19. The method of claim 13, wherein the third map data is generated based on a combination of the first map data and the second map data.

* * * * *